O. DORSEY.
HARVESTER-RAKE.

No. 175,677. Patented April 4, 1876.

Witnesses:
Alex Mahon
W. T. Hutchinson

Inventor:
Owen Dorsey,
by A. M. Smith,
Attorney

UNITED STATES PATENT OFFICE.

OWEN DORSEY, OF NEWARK, OHIO.

IMPROVEMENT IN HARVESTER-RAKES.

Specification forming part of Letters Patent No. 175,677, dated April 4, 1876; application filed January 28, 1876.

*To all whom it may concern:*

Be it known that I, OWEN DORSEY, of Newark, county of Licking, State of Ohio, have invented certain new and useful Improvements in Harvester-Rakes, of which the following is a full, clear, and exact description, reference being had to the accompanying drawing, making part of this specification, in which—

Figure 1:
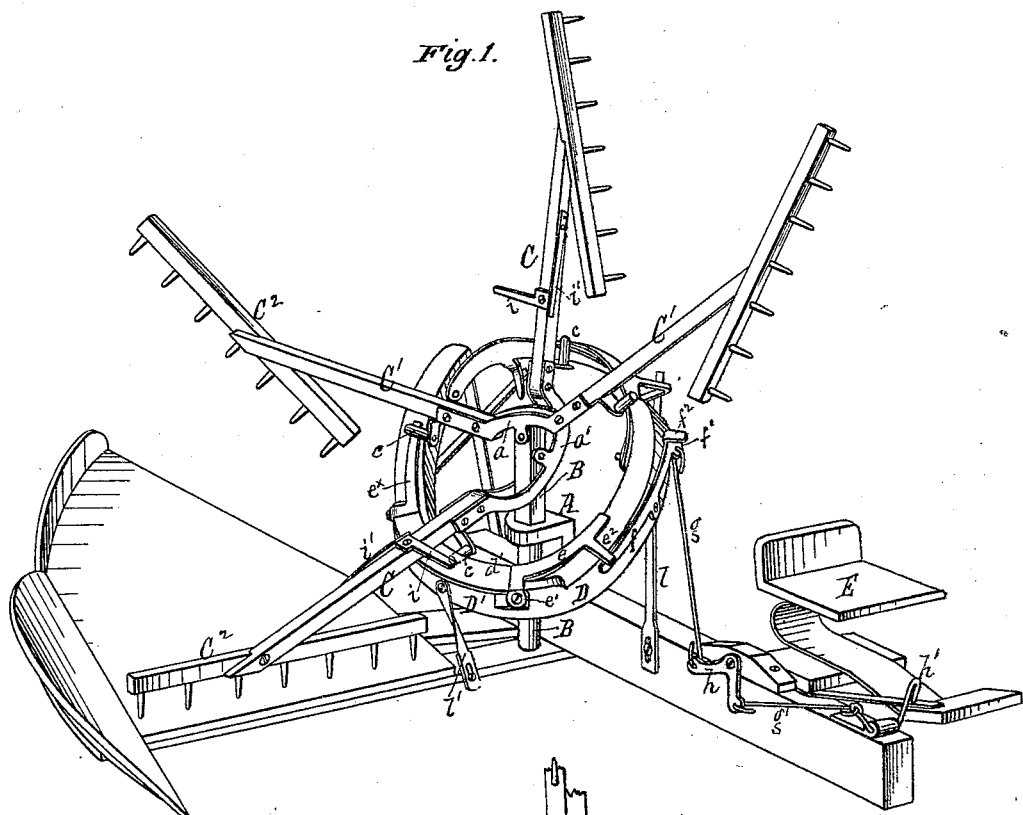
Figure 2:
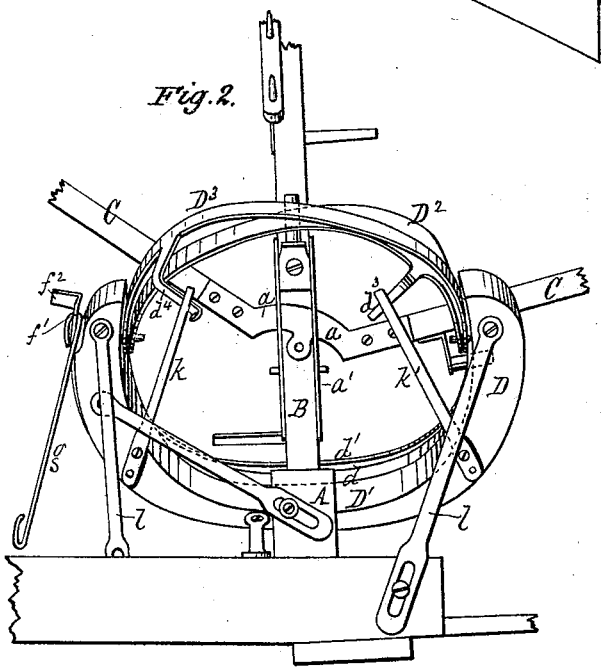

Figure 1 is a perspective view of so much of a harvesting-machine as is necessary to show my improvements; and Fig. 2 is a side elevation of the rake-stand and cam with its attachments, showing the rake-arms broken away in part.

Similar letters of reference denote corresponding parts in both figures.

My invention relates to an improvement upon the rake upon which Letters Patent were issued to me March 4, 1856, in which a series of rake-arms united in pairs were made to move around a vertical, or nearly vertical, shaft, to which said arms were pivoted horizontally, the vertical movements of the arms, and of the rake and gathering heads, being controlled by an adjustable but unvarying inclined cam way or track.

In said former invention the rake and reel arms were all compelled to pursue the same path; and to prevent the reel heads or beaters from sweeping the grain off the platform said beaters were left without teeth, and were raised considerably above the plane of the platform, to adapt them, after gathering the grain into the cutters and depositing it on the platform, to pass over the grain and leave it to accumulate in quantities sufficient to form a bundle, when the rake-head, following, would remove it from the platform, depositing it upon the ground in convenient shape for the binders. By uniting the rake and reel arms in pairs, as described, great steadiness of movement of the arms was secured; but the efficiency of the reel-beaters as gathering-heads was impaired by the necessity of dispensing with the teeth; and, further, while sufficient inclination could be given to the cam-track to pass the heads over the main or truck frame, on their return movement it was found impracticable, with the heads united to a straight arm in pairs, and with an unvarying cam, to raise them sufficiently to locate the driver on the machine.

The object of the present improvement is to obviate the difficulties referred to, while retaining the advantages resulting from uniting the rake-arms rigidly in pairs; and to this end the invention consists in uniting the rake and reel arms rigidly in pairs, through the medium of bent or angular straps or plates pivoted to the rake-shaft, and combining therewith a double track and a flexible or yielding cam-way, as hereinafter described, adapting the reel-arms to be lifted above the grain on the platform by the action of the cam-track, while the rake-heads are made to move in close proximity with said platform for removing the grain therefrom. It further consists in combining with the rake and reel arms, rigidly united in pairs, as described, novel means for controlling the path of said arms, whereby, either automatically or at the option of the attendant, said arms may be made to pursue the path either of rake or reel arms, in a manner hereinafter explained.

The main or truck frame of the machine, as also the cutting apparatus and quadrant-platform employed, may be of any usual or preferred construction, and the relative arrangement, and the manner of connecting said parts, may be that of any of the approved machines now in use, and they need not, therefore, be here described.

At any preferred point upon the machine is mounted a rake-support or standard, A, in a suitable bearing in which is mounted the vertical rake-shaft B, to which a rotary motion is imparted from any convenient driving-shaft on the machine, and through any preferred arrangement of gearing or sprocket-wheels, or pulleys and chain or band. At or near the upper end of this shaft B two bowed or angular yokes, $a\ a'$, are pivoted, the positions of these bows being reversed—that is to say, the upper one is made arching upward, and the lower one is inverted, as shown.

These yokes are, by preference, made in the form each of two parallel straps or plates, embracing the shaft B between them, with the rake and reel-arms $C\ C^1$ bolted between their ends, which are bent or deflected upward from a right line, for giving greater elevation to the rake and reel heads $C^2$ on their return movement over the frame of the machine.

Surrounding the shaft B is an irregular inclined cam way or track, D, the inner portion of which at $D^1$, adjacent to the platform, is made double, or provided with an internal groove, $d$, within which the friction-rollers $c$ on the rake-arms move, said rollers moving over the upper wall $d^1$ of said groove, or the upper face of the cam, when the arms act as reel-arms only.

The direction of movement of the rollers $c$ in passing into and through the grooved way $d$, or over the same, is controlled by a latch, $e$, pivoted at one end, at $e^1$, to the cam D, its forward or free end resting by its own gravity, or by the aid of a light spring, if preferred, upon the descending face of the cam-track D, as shown, in such manner that when said latch or gate is not raised to permit the rollers $c$ to pass under it to the cam-groove, said rollers will ride readily over it, and so cause the arms to pursue the upper track required to cause them to act as reel-arms. The latch or gate $e$, near its forward free end, is provided with a forwardly-projecting spur, $e^2$, which overhangs one arm of a lever, $f$, pivoted to the forward face of the cam D, and extended at its opposite end $f^1$ beyond the pivotal point, said end being connected, by means of links $g'$ $g'$ and an intermediate bell-crank lever, $h$, with a treadle, $h'$, arranged within convenient reach of the driver in his seat E, for lifting the latch $e$ and causing the arms to act as rake-arms at the option of the driver.

The arm $f^1$ of the lever $f$ is provided with a horizontal spur, $f^2$, and such of the rake-arms as it is desired shall act automatically to rake off the grain are provided with an arm or spur, $i$, projecting behind them relatively to the direction of their movement, and so arranged that as the roller $c$ approaches the latch or gate $e$, said arm $i$, as it descends with the rake-arm, shall strike upon the arm $f^2$ of lever $f$, causing said lever to lift the gate $e$, allowing the roller $c$ to pass under it. The arms $i$, by preference, are pivoted to the upper face of the rake-arms, and springs $i'$, secured to the rake-arms, by their pressure against the square pivoted end of the arms $i$, serve to hold said arms either in the position shown, for acting on the lever $f$ and gate $e$, or folded into a position at right angles thereto upon the face of the rake-arms and out of the way of the spur $f^2$.

By this arrangement any desired number of the arms can be adapted to act as rake-arms when required. The rear end of the groove $d$ is covered by a pivoted gate, $e^x$, which rises freely to permit the escape of the roller $c$ from the groove $d$, said gate returning by its own gravity to its former position, to bridge the end of said groove for the transfer of the rollers over the end thereof from the upper track $d^1$. The lower arms being rigidly connected with the upper arms in pairs, and the path of the former being changed, as described, the path of the arms in their return movement must of course be correspondingly changed; and to provide for this that portion of the cam D opposite the double-walled portion $D^1$ is made flexible or yielding, as follows: $D^2$ $D^3$ represent two curved wave-plates, pivoted at their ends to the ends of the rigid portion of the cam D, and upheld in firm contact with the traveling rollers $c$ by means of springs $k$ $k'$, also attached to the rigid portion of the cam D, pressing upward upon arms $d^3$ $d^4$, formed on the plates $D^2$ $D^3$. The plates $D^2$ $D^3$ yield each independently of the other, and are made in wave form on their upper faces, in such manner that they may accommodate themselves to the two rake and reel arms, resting upon different portions thereof at the same time. The rigid portion of the cam D is supported from the main frame, or from the cutter or platform frame or rake-standard, either or all, as preferred, by pivoted and slotted standards $l$ $l'$, secured by set-screws, by means of which the angle or position of the cam may be adjusted to suit the condition of the grain to be operated upon.

By the construction and arrangement of parts shown and described, it will be seen that the rake and reel arms, united in pairs, may be set at such an angle to each other as to give them any desired elevation, even to a vertical position, in their return movement over the machine, and the additional steadiness of movement of the rake-arm resulting from rigidly uniting it with the opposite returning arm is secured, while at the same time provision is made for causing the rake and reel arms to pursue the separate paths essential to the efficient performance of their respective functions.

Having now described my invention, what I claim as new, and desire to secure by Letters Patent, is—

1. The rake and reel arms united rigidly in pairs, substantially as described, in combination with a cam adapting said arms to pursue different paths, and acting on the returning inoperative arm, for holding the operative arm down to its work when acting as a rake-arm.

2. The rake and reel arms rigidly united in pairs, as described, in combination with the inclined double cam way or track D, for causing the rake and reel arms to pursue different paths, for the purpose and substantially as described.

3. The inclined cam D, provided with the groove $d$, or double-track portion $D^1$, and the yielding portion $D^2$ $D^3$, substantially as and for the purpose set forth.

4. The rake and reel arms rigidly united in pairs, and provided with the rollers $c$ and arms $i$, in combination with the grooved way $d$, gate $e$, and lever $f$, arranged and operating substantially as described.

OWEN DORSEY.

Witnesses:
OLIVER DORSEY,
THOMAS E. LEE.